(No Model.) 3 Sheets—Sheet 1.
H. S. NELSON & F. M. HEUETT.
COMBINED SEEDER AND HARROW.
No. 486,494. Patented Nov. 22, 1892.
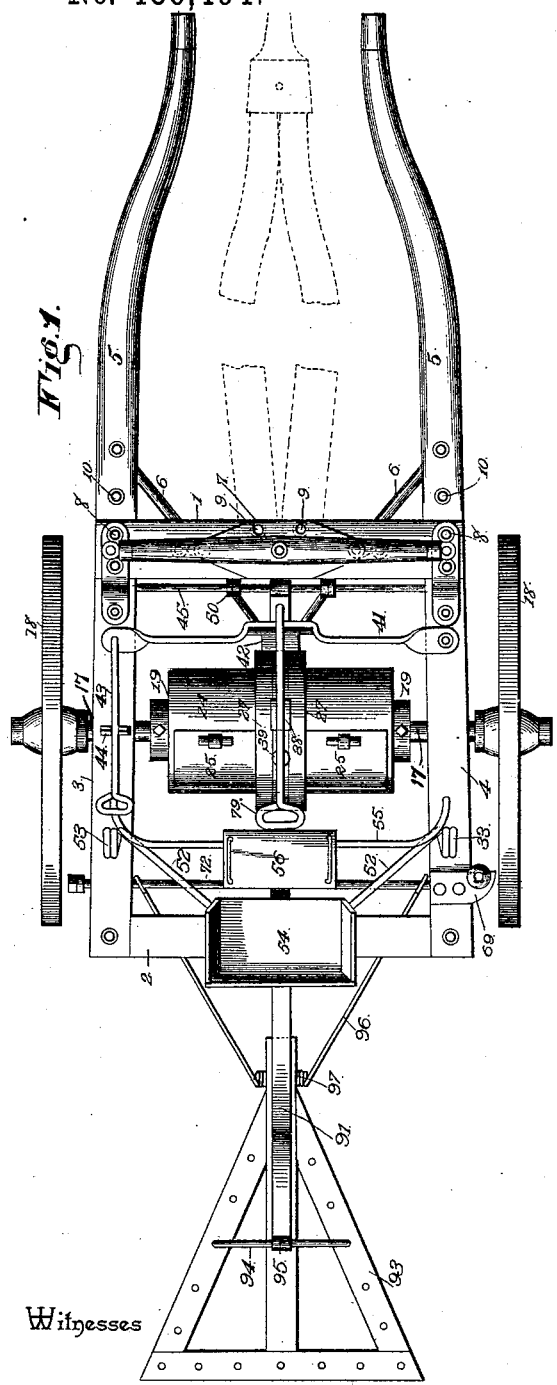
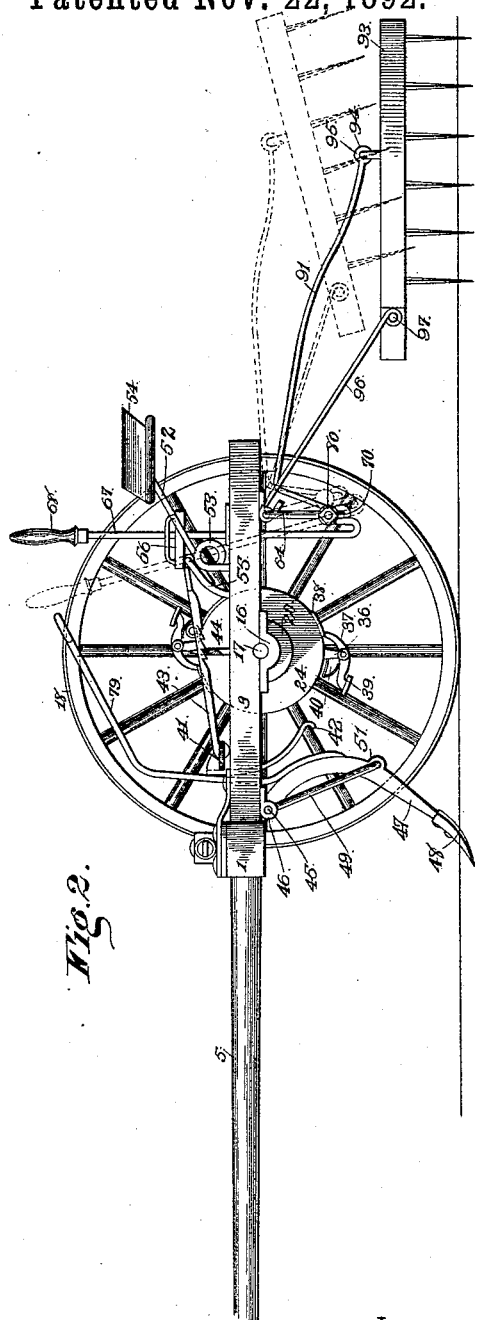
Witnesses
Inventors
Hayden S. Nelson
Francis M. Heuett
By their Attorneys, (No Model.) 3 Sheets—Sheet 2.
H. S. NELSON & F. M. HEUETT.
COMBINED SEEDER AND HARROW.
No. 486,494. Patented Nov. 22, 1892.
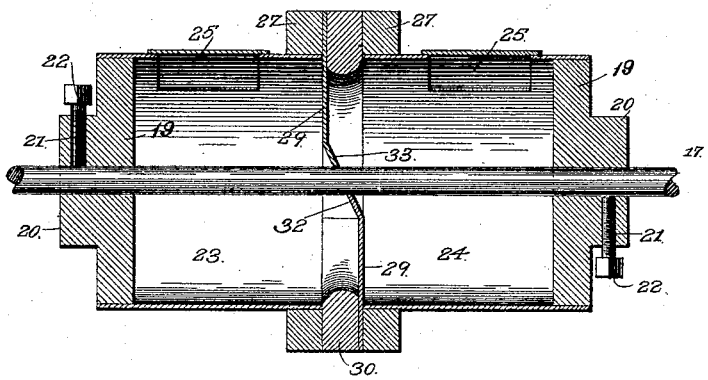
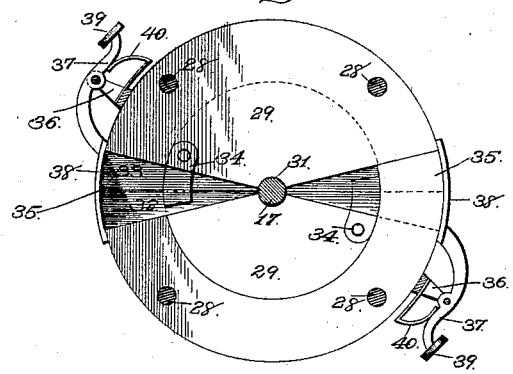
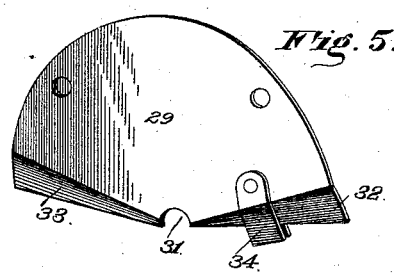
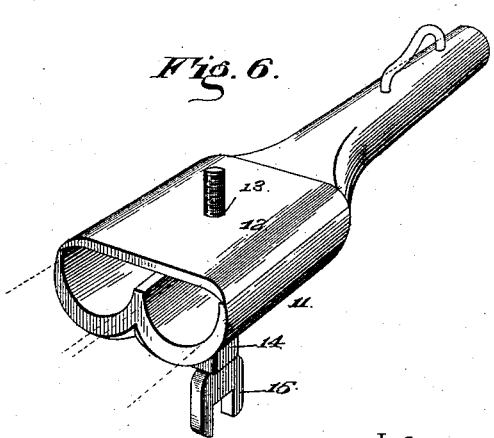
Witnesses
Inventors
Hayden S. Nelson
Francis M. Heuett
By their Attorneys, (No Model.) 3 Sheets—Sheet 3.
H. S. NELSON & F. M. HEUETT.
COMBINED SEEDER AND HARROW.
No. 486,494. Patented Nov. 22, 1892.
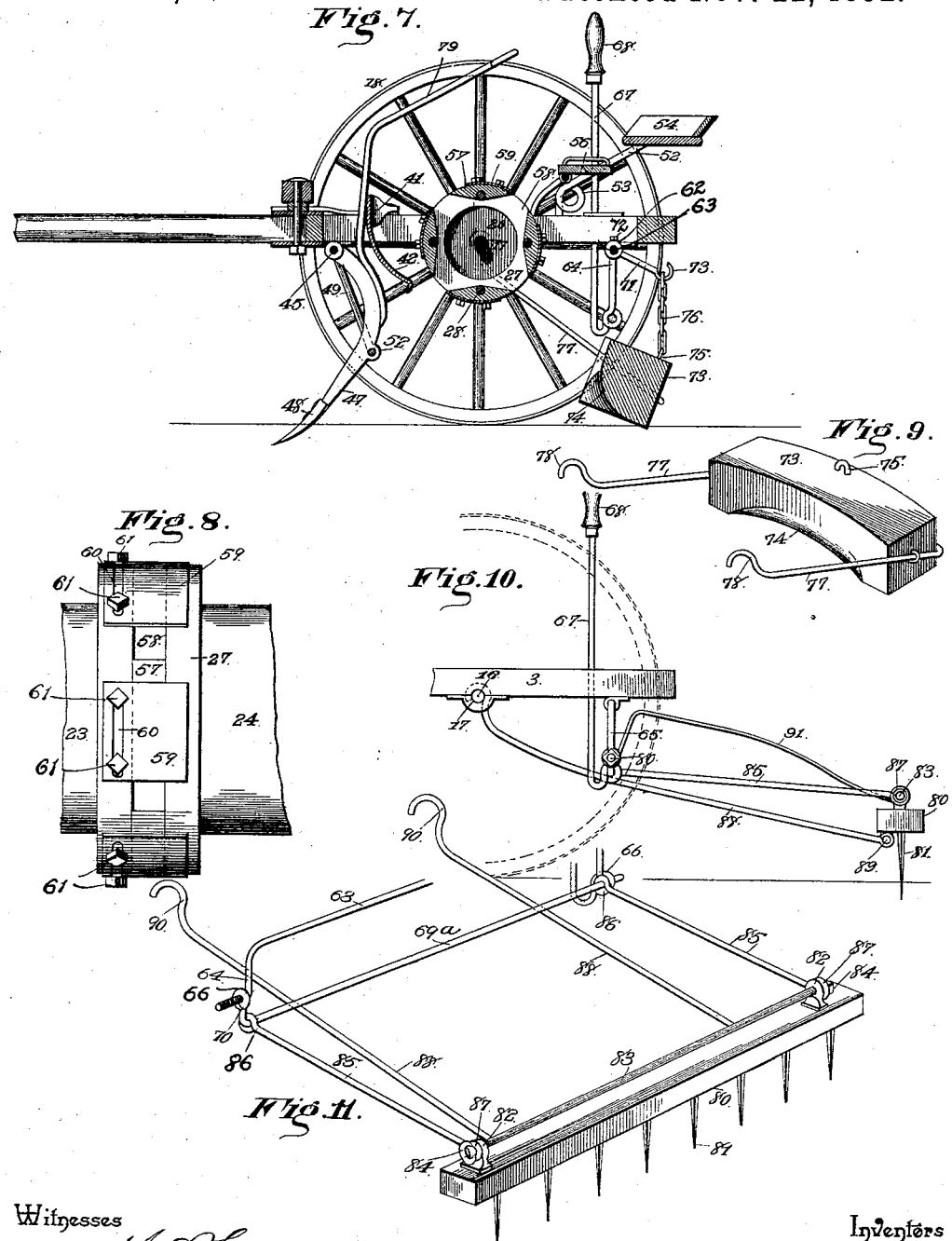
Witnesses
M. E. Fowler
J. H. Figgers
Inventors
Hayden S. Nelson and
Francis M. Heuett
By their Attorneys,
C. A. Snow & Co.
THE NORRIS PETERS CO., PHOTO-LITHO., WASHINGTON, D. C.

UNITED STATES PATENT OFFICE.

HAYDEN S. NELSON AND FRANCIS M. HEUETT, OF BEIRNE, ARKANSAS, ASSIGNORS OF ONE-HALF TO BETTIE HARDIN, MALISSA JANES, AND LEVI B. DANIELS, JR., OF SAME PLACE.

COMBINED SEEDER AND HARROW.

SPECIFICATION forming part of Letters Patent No. 486,494, dated November 22, 1892.

Application filed May 12, 1892. Serial No. 432,812. (No model.)

*To all whom it may concern:*

Be it known that we, HAYDEN S. NELSON and FRANCIS M. HEUETT, citizens of the United States, residing at Beirne, in the county of Clark and State of Arkansas, have invented a new and useful Combined Seeder and Harrow, of which the following is a specification.

Our invention relates to combined planters and harrows; and the objects in view are to provide a machine that may be employed for planting cotton, corn, distributing fertilizer, harrowing the ground, for raking, and for covering the seed.

Various other objects and advantages of our invention will appear in the following description, and the novel features thereof will be particularly pointed out in the claims.

Referring to the drawings, Figure 1 is a plan view of a machine embodying our invention, and Fig. 2 is a side elevation of the same, in both instances the harrow attachment being applied. Fig. 3 is a longitudinal section of the hopper, the same being arranged for planting corn and distributing with it fertilizer. Fig. 4 is a transverse section through the hopper. Fig. 5 is a detail in perspective of one of the semicircular partition-plates employed in the hopper. Fig. 6 is a detail in perspective of a socket for receiving the two ends of the shafts or thills, and thus combining them to constitute a draft-tongue. Fig. 7 is a vertical longitudinal section of the machine, the same being in condition for planting and covering cotton. Fig. 8 is a partial elevation of the hopper as shown in Fig. 7. Fig. 9 is a detail in perspective of the cotton-covering drag-block. Fig. 10 is a side elevation of the rear part of the machine, the rake being applied thereto. Fig. 11 is a detail in perspective of the rake and an illustration of the connection between it and the machine.

Like numerals of reference indicate like parts in all the figures of the drawings.

In practicing our invention we employ a rectangular framework comprising a front end bar 1, a rear end bar 2, and opposite parallel side bars 3 and 4, the front and rear ends of which are connected by said end bars. The front bar 1 has removably secured to its extremities opposite thills 5, and pivotally connected at their front ends to said thills are braces 6, the rear ends of said braces being pivotally connected to the bar 1 at points centrally between the thills 5 and a central socket 7. (Indicated by dotted lines in Fig. 1 and shown in Fig. 6.) The ends of the thills enter sockets formed in the front face of the bar 1 near its ends and are secured in position by means of bolts 8. By removing these bolts the thills may be withdrawn, swung together, as shown by dotted lines in Fig. 1, so that their front and rear ends contact, and have said rear ends forced into a mortise or socket 7. When in this position, the bolts 8 are passed through perforations 9, formed in the upper wall of the socket 7, and down through openings 10, formed in the thills.

In Fig. 6 we have illustrated a metal socket or tip for receiving the front ends of the thills when combined to form a pole. This socket or tip consists of upper and lower members 11 and 12, respectively, the latter having its upper side concaved to receive the front ends of the thills, and the two being perforated at 13 for the reception of a binding-screw 14. This binding-screw may have a wrench-head 15 formed on its upper end, and the same is adapted to operate upon the various nuts of some of the movable parts.

We do not herein claim the foregoing subject-matter in this specification, as the same forms the subject-matter of a previous patent granted to F. M. Heuett October 5, 1880, and numbered 232,967.

In bearings 16, with which the under sides of the bars 3 and 4 are provided, there is journaled a transverse axle 17, and the same is provided at its ends beyond the bars 3 and 4 with wheels 18. Mounted upon the axle between the side bars is the hopper, and the same consists of a pair of opposite end walls or disks 19, provided with external hubs 20, through perforations 21 in which pass clamping-screws 22, the inner ends of which bear upon the axle 17.

23 and 24 designate a pair of sheet-metal cylindrical sections, the outer ends of which surround the end walls or disks 20 and are further provided with covered openings 25, through which the seed or fertilizer may be introduced into the hopper. The inner ends of each of the cylindrical sections are surrounded or encircled by a ring 27, and binding-bolts 28 pass through the two rings and any intermediate object that is interposed between the rings, and which, as will hereinafter appear, varies in accordance with the purpose of planting corn or cotton. In Fig. 3 we have illustrated the hopper as adapted for planting corn and simultaneously distributing fertilizer. In such instance a pair of semicircular metal plates 29 is applied at opposite sides of the axle, said metal plates being interposed between the opposite clamping-rings 27 and the adjacent faces of a series of intermediate semicircular blocks 30. Each of the semicircular sections 29 is provided with a semicircular notch 31 at its center, so as to embrace the axle, and has its edge at one side of its center bent in one direction, as at 32, while its opposite edge is reversely bent, as at 33. Pairs of metal straps 34 connect the two sections, and the whole constitutes a circular partition, dividing the hopper off into a corn-receiving chamber and a fertilizer-receiving chamber, all as clearly shown in Fig. 3. By the bending of the semicircular partitions it will be seen that said partitions combine to form discharges from each chamber, as indicated at 35, at opposite sides of the hopper. Pairs of bearing-lugs 36 extend from the space-blocks 30, and fulcrumed therein are compoundly-curved levers 37, the inner ends of which terminate in curved plates 38 and the outer ends thereof terminate in heads 39. The plates normally close the openings 35 through the medium of springs 40, which press upwardly against the outer ends of the levers.

A cross-bar 41 (see Figs. 1 and 7) is pivotally connected to the side bar 4 of the frame, and from the center of the cross-bar depends a cam-arm 42, the lower end of which is inwardly curved. This cam-arm extends in the path of the heads of the levers 37, so that as they are successively brought against the same the levers are oscillated against the tension of their springs, and thus the seed-openings are uncovered and seed and fertilizer dropped. The bar 41 is loosely connected or adapted to oscillate upon the side bar, and may be operated—that is, moved so as to throw the cam-arm 42 out of the path of the levers—by means of a hand-lever 43. This lever may be moved and locked over a standard 44, and thus the cam-arm locked in position for operation.

A transverse shaft 45 is journaled in brackets 46, located upon the under side and at the front ends of the side bars 3 and 4. 47 designates a curved standard, the upper end of which is pivoted upon the shaft 45, the lower end of which is provided with a furrow-opening shovel 48, located below the center and in front of the framework. A V-shaped bail 49, having eyes 50, is loosely mounted upon the shaft 45 and passes through a perforation 51, formed on the rear side of the standard 47. Seat-standards 52 rise from the side bars 3 and 4, are coiled to form springs 53, and support a seat 54. Upon a bar 55, mounted on the bars 3 and 4, a foot-rest 56 is located in front of the seat 54.

Referring more particularly to Figs. 7 and 8, we have shown the hopper as the same is used for distributing cotton-seed. In this instance the same rings 27 are employed, the end disks 20, and the bolts 28; but the intermediate space-blocks 30 are removed and a series of four quadrant-shaped space-blocks 57 are substituted. These space-blocks 57 form intermediate openings or discharges 58. Curved plates 59 are located between the openings 58, or, in other words, upon each of the blocks 57, and these plates are longitudinally slotted at 60, and bolts 61 pass through the slots and into one of the rings 27. By loosening the bolts 61 the plates 59 may be moved so as to close more or less of the openings 58, and thus increase or decrease the size of the openings and the discharge of the cotton. In eyes 62, located upon the under sides and near the ends of the side bars 2 and 3, there is mounted a rock-shaft 63. This rock-shaft at one end beyond the eyes is bent to form the crank 64 and at its opposite end is downwardly bent to form a rock-arm 65, is coiled to form a bearing-eye 66, and then extended upwardly to form a lever 67, which terminates at its upper end in a handle 68, within easy reach of the driver when mounted upon the seat 54. This lever may be swung over and into engagement with a notched plate 69, which projects from the side bar 4 near its rear end, and when thus locked the arm 65 and crank 64 are swung to an inclined position. A rod 69ª has one of its ends passed through the eye 66 and its opposite end bent upwardly and terminating in an eye 70, which receives the threaded end of the crank-arm 64 of the rock-shaft 63. Nuts 80 are mounted on the ends of the crank-arm 64 and rod 69, whereby the parts are prevented from separation. A rock-arm 71 is mounted adjustably by a bolt 72 upon the rock-shaft 63, and said rock-arm is disposed at an angle to the crank 64 and arm 65 and terminates at its outer end in a hook 73.

In Figs. 7 and 9 we have illustrated an attachment to be employed when the machine is in the act of planting cotton, and the same consists of a body or block 73, having a curved under side 74, whereby it is adapted to ride over the ground. An eye 75 is mounted upon the block, and a chain 76 connects the eye with the hook 73 of the rock-arm 71. A bail 77 embraces the block, inclines upwardly from the same, and has its front end bent to form hooks 78, which loosely engage the axle 17. The operation of this device will at once be apparent and requires no special description. The shovel 48 opening the furrow, the cotton drops from the hopper into the same, and the block 73 being hollowed, as at 74, returns the soil to the furrow. In order to elevate the block, it is simply necessary to swing the lever 67 to the front and engage it over the plate 69, whereby it is locked from returning. A hand-lever 79 projects upwardly from the standard 47, and it also may be operated to elevate or depress said standard, so as to throw it out of or into operative position.

In Figs. 10 and 11 we have illustrated a rake attachment. 80 designates the rake-bar, from the under side of which depend the teeth 81 and from the upper side of which near its ends extend the bearing-lugs 82. A shaft or rod 83 passes through the ears and has its ends threaded to receive nuts 84. A pair of arms or connecting-rods 85 terminates in eyes 86 at their front ends. The front eyes loosely engage the rod 69ª, while the rear eyes engage the rod 83 and are clamped between the nuts and ears 82. A pair of draft-bars 88 extends from the lugs 89 upon the under side of the rake-head or bar, and said bars are provided at their front ends with hooks 90 for engaging the axle 17. A flat spring-strap 91, Figs. 2 and 10, has its forward end bent to engage with the rock-shaft and its rear end declined and engaging with the shaft or rod 83 of the rake. This strap is resilient and exerts its influence upon the head of the rake in order to keep it steady and press it to its work.

93 designates an ordinary triangular harrow-frame, Figs. 1 and 2, and the same is provided upon its upper side with a cross-bar 94, to which the spring-strap 91 is connected removably at its rear end through the medium of a hook 95, in which said end terminates. Draft-bars 96 are pivoted at their rear ends at 97 to the front end of the harrow-section, and the front ends of said draft-bars engage over the transverse bar 72. This harrow is applied when the machine is utilized for planting corn and distributing fertilizer.

From the foregoing description, in connection with the accompanying drawings, it will be observed that we have provided a machine of great convenience to agriculturists and that the same is capable of being used for a corn-planter and fertilizer-distributer, as a harrow with or without the planting mechanism, as a rake, as a cotton-planter with or without the block, and as a furrow-coverer with or without the planting mechanism.

Having described our invention, what we claim is—

1. In a machine of the class described, the combination, with the rotatable axle, the opposite disks, and the cylindrical hopper-sections having openings and doors for covering the same, of rings encircling the inner ends of the cylindrical sections, space-blocks interposed between the rings, semicircular partitions interposed between the opposite sides of the space-blocks and the rings and having their meeting edges reversely bent at points opposite the discharge-openings, and bolts passed through the rings, partitions, and blocks, substantially as specified.

2. In a machine of the class described, the combination, with the rotatable axle, the opposite disks, and the cylindrical hopper-sections having openings and doors for covering the same, of rings encircling the inner ends of the cylindrical sections, space-blocks interposed between the rings, semicircular partitions interposed between the opposite sides of the space-blocks and the rings and having their meeting edges reversely bent at points opposite the discharge-openings, bearings located in rear of each opening, curved levers pivoted in the bearings and connected with plates covering the openings, springs pressing against the rear ends of the levers, and a cam located in the path of the heads of the levers and adapted to actuate the same, so as to elevate the plates from over the openings, substantially as specified.

3. In a machine of the class described, the combination, with the framework, the axle, the hopper mounted thereon and having discharge-openings and adapted to rotate with the axle, curved levers fulcrumed in rear of the openings and provided with plates covering the openings, springs interposed between the rear ends of the levers, and the hopper for normally closing the plates over the openings, of a cross-bar pivoted to one side of the framework and loosely lying in the opposite side, a standard rising from the said opposite side, and a lever loosely connected to the free end of the cross-bar and notched to engage the standard, substantially as specified.

4. In a machine of the class described, the combination, with the framework, the hopper, and discharge mechanism, of the transverse shaft 45, mounted in bearings 46 in the under side of the framework, the curved standard 47, pivoted upon the shaft, the V-shaped bail 49, passing through an opening in the rear side of the standard and at its upper ends loosely engaging the shaft, and the lever 79, rising upwardly and rearwardly from the standard, substantially as specified.

5. In a machine of the class described, the combination, with the rectangular frame having bearing-eyes upon its under side near its rear end, the rock-shaft 63, located in the eyes, bent at one end to form the crank 64 and at its opposite end to form the eye 66 and lever 67, terminating in the handle, means for locking the lever, a rod 69ª, having one end passed through the eye 66 and its opposite end upwardly bent to form an eye 70, engaging the crank-arm 64, and nuts on the end of the arm 64 and rod 69ª, of a following attachment comprising a pair of draft-arms engaging the axle and rods connected with the rod 69ª, substantially as specified.

6. In a machine of the class described, the combination, with the rectangular frame having bearing-eyes upon its under side near its rear end, the rock-shaft 63, located in the eyes, bent at one end to form the crank 64 and at its opposite end to form the eye 66 and lever 67, terminating in the handle, means for locking the lever, a rod 69$^a$, having one end passed through the eye 66 and its opposite end upwardly bent to form an eye 70 for engaging the crank-arm 64, and nuts on the end of the arm 64 and rod 69$^a$, of a following attachment comprising a pair of draft-arms engaging the axle and rods, connected with the rod 69$^a$, and a spring-strap 91, connected to the rod 69$^a$, having its rear end removably connected with and bearing upon the follower, substantially as specified.

7. In a machine of the class described, the combination, with the framework and the bearing-eyes in the rear end of the same, of the rock-shaft mounted in the bearing-eyes and terminating beyond the same in rock-arms, a cross-bar connecting the bearing-arms, a lever for operating the rock-shaft of a follower, means for connecting the same with the rock-arms of the rock-shaft, and arms extending forward from the follower and terminating in hooks engaging the axle, substantially as specified.

8. In a machine of the class described, the combination, with the framework, the bearing-eyes on the under side thereof, the rock-shaft mounted in the eyes and terminating beyond the same in rock-arms having eyes, a rod located in the eyes, a lever for rocking the shaft, and a keeper located on the rear bar of the frame, of a harrow, a bar on top thereof, a spring-strap having its front end mounted in the keeper and its rear end terminating in a hook engaging the bar of the harrow and bearing thereon, and rods extending forwardly from the harrow and engaging the rock-shaft, substantially as specified.

In testimony that we claim the foregoing as our own we have hereto affixed our signatures in the presence of two witnesses.

HAYDEN S. NELSON.
FRANCIS M. HEUETT.

Witnesses:
  M. L. DANIEL,
  JOHN WHITE.